US012371871B2

(12) United States Patent
Painchaud

(10) Patent No.: US 12,371,871 B2
(45) Date of Patent: Jul. 29, 2025

(54) ADJUSTABLE LOCKING MECHANISM FOR BUCKET DOOR

(71) Applicant: 9257-5810 QUÉBEC INC., Plessisville (CA)

(72) Inventor: Mathias Painchaud, Victoriaville (CA)

(73) Assignee: 9257-5810 QUÉBEC INC., Plessisville (CA)

( * ) Notice: Subject to any disclaimer, the term of this patent is extended or adjusted under 35 U.S.C. 154(b) by 783 days.

(21) Appl. No.: 17/694,739

(22) Filed: Mar. 15, 2022

(65) Prior Publication Data

US 2022/0290400 A1 Sep. 15, 2022

Related U.S. Application Data

(60) Provisional application No. 63/161,036, filed on Mar. 15, 2021.

(51) Int. Cl.
*E02F 3/407* (2006.01)
*E05B 57/00* (2006.01)

(52) U.S. Cl.
CPC ............ *E02F 3/4075* (2013.01); *E05B 57/00* (2013.01)

(58) Field of Classification Search
CPC ....................... E05B 57/00; E02F 3/401-4075
See application file for complete search history.

(56) References Cited

U.S. PATENT DOCUMENTS

| | | | | | |
|---|---|---|---|---|---|
| 1,905,191 | A * | 4/1933 | Snow, Jr. | E02F 3/4075 | 414/726 |
| 5,469,647 | A * | 11/1995 | Profio | E02F 3/4075 | 414/718 |
| 6,979,167 | B2 * | 12/2005 | Geraghty | E02F 3/3604 | 172/275 |
| 8,777,546 | B2 * | 7/2014 | Lanting et al. | E02F 3/3414 | 37/468 |
| 2011/0146114 | A1 * | 6/2011 | Hren et al. | E02F 3/4075 | 37/445 |
| 2013/0340300 | A1 * | 12/2013 | Flores | E02F 3/4075 | 37/445 |
| 2015/0033594 | A1 * | 2/2015 | Nicoson | C22C 38/02 | 37/445 |

(Continued)

FOREIGN PATENT DOCUMENTS

| | | | | |
|---|---|---|---|---|
| EP | 3505686 B1 * | 7/2024 | | E02F 3/28 |
| WO | WO-2020000012 A1 * | 1/2020 | | E02F 3/4075 |

*Primary Examiner* — Tara Mayo
(74) *Attorney, Agent, or Firm* — NORTON ROSE FULBRIGHT CANADA LLP

(57) ABSTRACT

A locking mechanism for a bucket of the type having a main body defining a cavity and an opening. A door is pivotally mounted on the main body, the door movable between a closed position and an opened position. A locking mechanism has a latch bar engaged by a lever bar, the lever bar in abutment against a fulcrum, the lever bar movable between a locked position in which the latch bar locks the door in the closed position by engagement with an abutment surface on the main body, and an unlocked position in which the latch bar is disengaged from the abutment surface to allow movement of the door from the closed position to the opened position. An adjusting mechanism may be operable to move the fulcrum relative to the door to vary an overlap of the latch bar with the at least one abutment surface.

22 Claims, 7 Drawing Sheets

(56) References Cited

U.S. PATENT DOCUMENTS

| | | | | |
|---|---|---|---|---|
| 2015/0191890 | A1* | 7/2015 | Ryan | E02F 3/46 414/815 |
| 2016/0024745 | A1* | 1/2016 | Lunderskov et al. | E02F 9/2207 37/445 |
| 2017/0138015 | A1* | 5/2017 | Jamilosa | E02F 3/60 |
| 2017/0306585 | A1* | 10/2017 | Zamorano Jones et al. | E02F 9/006 |
| 2018/0142440 | A1* | 5/2018 | Gross et al. | E02F 3/308 |

* cited by examiner

ADJUSTABLE LOCKING MECHANISM FOR BUCKET DOOR

CROSS-REFERENCE TO RELATED APPLICATION

The present application claims the priority of U.S. patent application Ser. No. 63/161,036, filed on Mar. 15, 2022 and incorporated herein by reference.

TECHNICAL FIELD

The present application relates to excavation equipment such as earth-working buckets, also known as excavation buckets and dippers, and more particularly to door locking mechanisms of such equipment.

BACKGROUND OF THE ART

Excavation equipment, and in particular earth working buckets such as cable shovel dippers, are used, amongst other applications, for heavy earthwork applications such as mining and excavation. Buckets typically have a leading edge, also known as the lip, that performs a digging action, so as to fill the cavity of the bucket. A closable door is on the trailing end of the bucket, and may be opened to empty the bucket of its content. Due to the weight of the content in the bucket, and the harsh conditions of operation (e.g., moisture, dirt, abrasiveness), known mechanisms to close the bucket door are exposed to wear, and this may hamper the closing action of the door and lead to maintenance, downtime, repairs, etc. In some cases, adjustments of the mechanisms take time. Improvements are sought.

SUMMARY

In an aspect of the present disclosure, there is provided a locking mechanism for a bucket of the type having a main body defining a cavity and an opening configured for unloading a content of the bucket from the cavity and a door pivotally mounted on the main body, the door movable between a closed position in which the opening is substantially closed by the door and an opened position in which the content may exit the bucket via the opening, the locking mechanism comprising: a locking mechanism having a latch bar engaged by a lever bar, the lever bar in abutment against a fulcrum, the lever bar movable between a locked position in which the latch bar locks the door in the closed position by engagement with at least one abutment surface on the main body, and an unlocked position in which the latch bar is disengaged from at least one abutment surface to allow movement of the door from the closed position to the opened position; and an adjusting mechanism operable to move the fulcrum relative to the door to vary an overlap of the latch bar with the at least one abutment surface.

In another aspect, there is provided a bucket comprising: a main body defining a cavity and an opening for unloading a content of the bucket from the cavity; a door pivotally mounted on the main body, the door movable between a closed position in which the opening is substantially closed by the door and an opened position in which the content may exit the bucket via the opening; a locking mechanism having a latch bar engaged by a lever bar, the lever bar in abutment against a fulcrum, the lever bar movable between a locked position in which the latch bar is received within a recess defined by the main body and in which the door is locked in the closed position, and an unlocked position in which the latch bar is disengaged from the recess to allow the door to move from the closed position to the opened position; and an adjusting mechanism operable to vary a position of the fulcrum relative to the door to vary a penetration depth of the latch bar into the recess.

In a further aspect of the present disclosure, there is provided a locking mechanism for a door of a bucket, comprising: a latch bar engaged by a lever bar, the lever bar in abutment against a fulcrum, the lever bar movable between a locked position in which the latch bar is received within a recess defined by the main body and in which the door is locked in the closed position, and an unlocked position in which the latch bar is disengaged from the recess to allow the door to move from the closed position to the opened position; and an adjusting mechanism operable to vary a position of the fulcrum relative to the door to vary a penetration depth of the latch bar into the recess.

Many further features and combinations thereof concerning the present improvements will appear to those skilled in the art following a reading of the instant disclosure.

DETAILED DESCRIPTION

Figure 1:
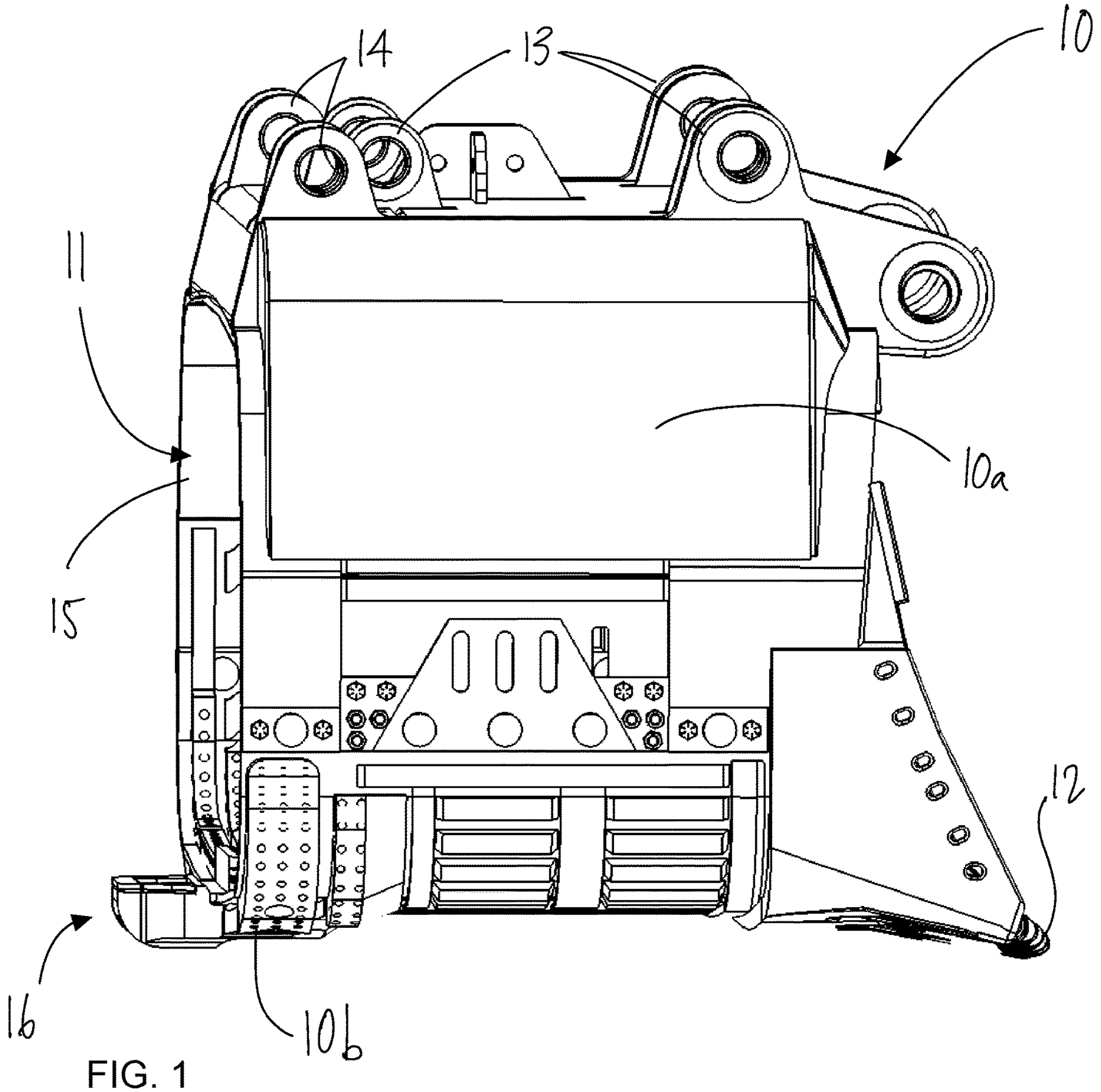
FIG. 1 is a three dimensional view of a bucket in accordance with one embodiment.

Referring to FIG. 1, a bucket is shown at 10. The bucket 10 may be used for excavation, for example as part of a cable shovel dipper of the type generally used on electric-cable shovels to scoop ore, earth, dirt from the ground, and is an example of the numerous types of excavation equipment that may benefit from the configuration described hereinafter for a locking system for a door thereof. Other types of excavation equipment and like earth working buckets include electric rope shovels, hydraulic face shovels, hydraulic backhoe, loader, dragline, bucket-wheel excavator, etc. However, for simplicity, the present disclosure refers to the bucket 10, although it is understood that other excavation equipment may use the configuration described hereinafter.

As a general description, the bucket 10 has a main body 10*a*, generally tubular in shape, or hollow as another way to described the body 10*a*, having a leading end for excavation, and a trailing end opposite the leading end. The bucket 10 defines an inner cavity 11 for receiving earth or like excavation products, with a lip 12 leading the excavating. The lip 12 is shown generally in FIG. 1, but may have numerous components, such as teeth, shrouds, C-clamps, wear plates, to name a few. Various connectors 13 are provided on a top surface of the bucket 10, to connect the bucket 10 to a handle, to a stick, to an arm, etc, of a cable shovel dipper, crane or like equipment or vehicle. Any appropriate type of connector may be used.

Pivot supports 14 may be adjacent to a trailing end of the bucket 10. The pivot supports 14 may be provided on both sides of the bucket 10, and are above a trailing opening 15 of the bucket 10 through which the load of earth in the inner cavity 11 of the bucket 10 may be unloaded. The pivot supports 14 are provided to pivotally support a door 20 (FIG. 2), which door 20 selectively opens the trailing opening 15 and closes the trailing opening 15. The door 20 is closed during the excavating or digging, while the door 20 is allowed to open to unload the content of the bucket 10, by the effect of gravity.

Still referring to FIG. 1, the bucket 10 may also have a ledge 16, also referred to as a latch keeper, at a bottom edge 10*b* of the bucket 10. The latch keeper 16 may be an add-on feature to the bucket 10, or may be an integral part of the bowl of the bucket 10. The latch keeper 16 defines an abutment surface(s), for instance by way of a surface portion, rollers, an opening 16*a* (FIG. 5) or a recess to collaborate with a latch component mounted to or part of the door 20 to maintain the door 20 closed in spite of gravity, for the content of the bucket 10 to remain in the bucket 10. As will be explained below, the latch component may be moved to selectively unlock the door 20 to allow an emptying of the bucket 10 or to lock the door 20 in a closed position.

Figure 2:
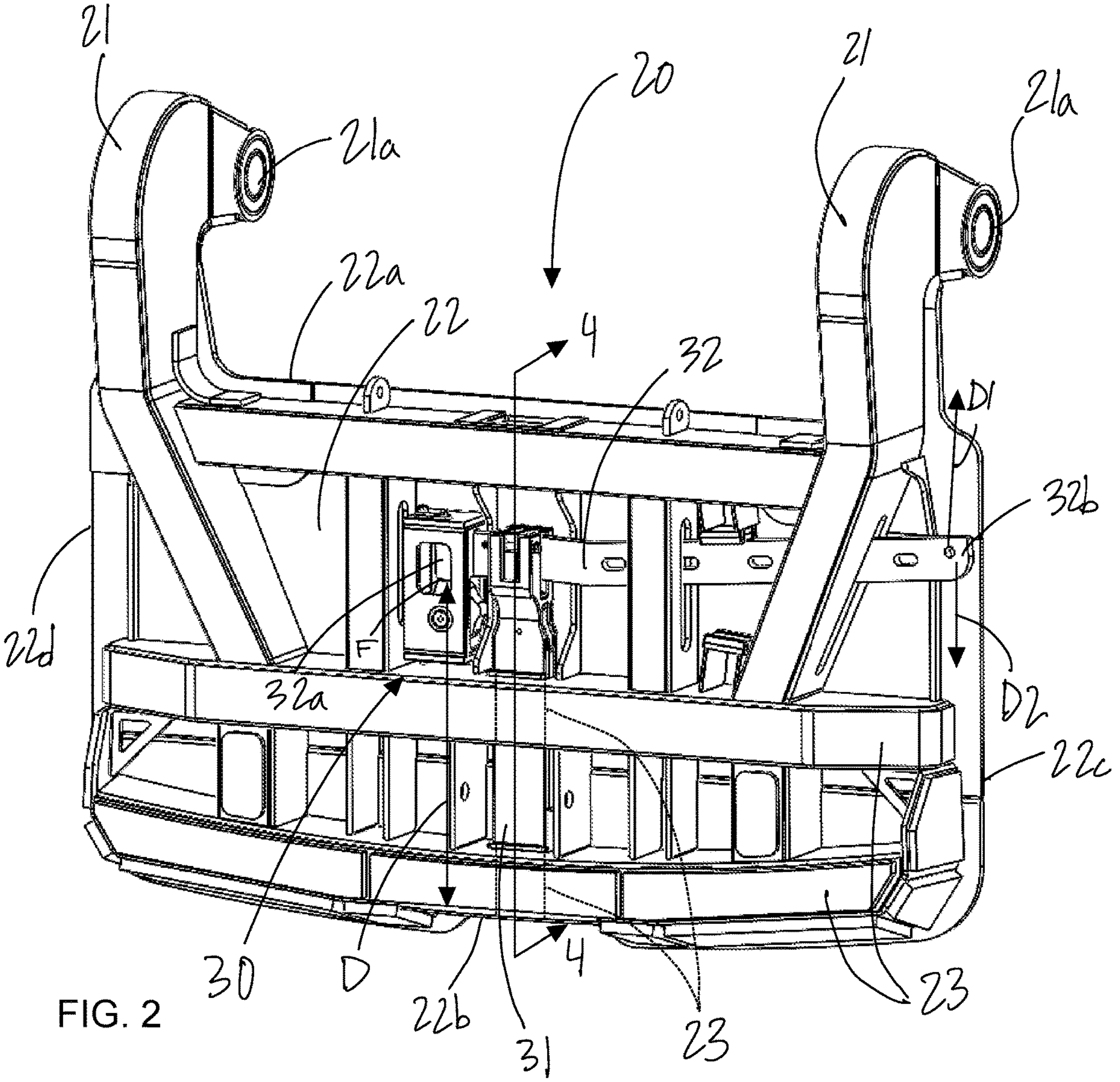
FIG. 2 is a three dimensional view of a door in accordance with one embodiment for the bucket of FIG. 1.

Referring now to FIG. 2, the door 20 is described in more detail. The door 20 includes two arms 21 secured to a main body 22 of the door 20. The main body 22 has a top edge 22*a*, a bottom edge 22*b* and two lateral edges 22*c*, 22*d* extending from the top edge 22*a* to the bottom edge 22*b*. The two arms 21 protrude from the main body 22 of the door 20 beyond the top edge 22*a*. Each of the two arms 21 may be L-shaped and defines an opening 21*a* at a distal end thereof for receiving a pivot. Each of the distal ends of the two arms 21 is received between two respective ones of the pivot supports 14 (FIG. 1) of the bucket 10 and a pin or pivot extends through the pivot supports 14 and into the openings 21*a* of the arms 21. The door 20 is therefore pivotally mounted to the bucket 10 and is pivotable between a closed position in which the opening 15 is closed by the door 20 and an open position in which the opening 15 is accessible. Any suitable means are contemplated to pivotally connect the door 20 to the bucket 10 such as, for instance, hinges. Other configurations are contemplated. For instance, each of the arms 21 may define a fork at its distal end to receive a pivot support between prongs of the fork. The door 20 includes two horizontal ribs 23 secured to the main body 22 and extending between the two lateral edges 22*c*, 22*d* of the main body 22 of the door 20. Each of the two horizontal ribs 23 defines a passage 23*a* therein. The passages 23*a* of the two horizontal ribs 23 are aligned with one another and are sized to slidably receive another component as will be described below. It is understood that the passages 23*a* need not be defined by the horizontal ribs 23 and that other means may be used to define the passages 23*a*, such as brackets secured to the main body 22 of the door 20.

Figure 3:
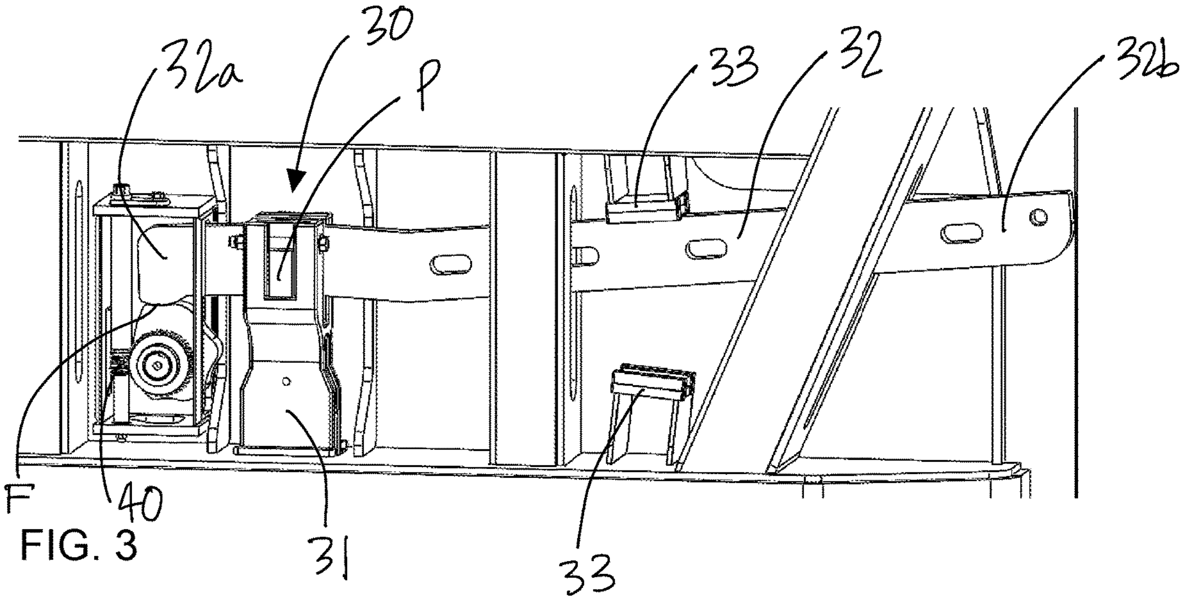
FIG. 3 is an enlarged view of a portion of FIG. 2.

Referring to FIGS. 2-5, the door 20 includes a locking mechanism 30 that includes a latch bar 31. The latch bar 31 is slidably movable within the passages 23*a* defined by the two horizontal ribs 23 of the main body 22 of the door 20. The passages 23*a* are schematically illustrated with dashed lines in FIG. 2. The latch bar 31 may therefore be constrained to movement in one translational degree of freedom (DOF), though some play is possible. A lever bar 32 is pivotally engaged to the latch bar 31 at a location between a first end 32*a* and a second end 32*b* of the lever bar 32. The second end 32*b* of the lever bar 32 is movable along a first direction D1 toward a top of the body 22 of the door 20 and along a second direction D2, opposed to the first direction D1, toward a bottom of the body 22 of the door. The lever bar 32 has a locked position and an unlocked position. The unlocked position is shown in FIGS. 2-3. In both positions, the lever bar 32 is in abutment against stoppers 33 (FIG. 3) secured to the body 22 of the door 20, to the two horizontal ribs 23, or to any other feature of the door 20. The stoppers 33 therefore define upper and lower limits of the movements of the lever bar 32 between its locked and unlocked positions.

Referring more particularly to FIG. 2, the first end 32*a* of the lever bar is in abutment against a fulcrum F secured to the body 22 of the door 20. A distance between the fulcrum F and a connection point P between the lever bar 32 and the latch bar 31 is less than a distance between the connection point P and the second end 32*b* of the lever bar 32 to create a lever effect. In an embodiment, the ratio of distances is at least 5:1. It will be appreciated that, in an alternate embodiment, the fulcrum F may be located between the first and second ends 32*a*, 32*b* of the lever bar 32 and the latch bar 31 may be attached to the first end 32*a* of the lever bar 32.

Figure 5:
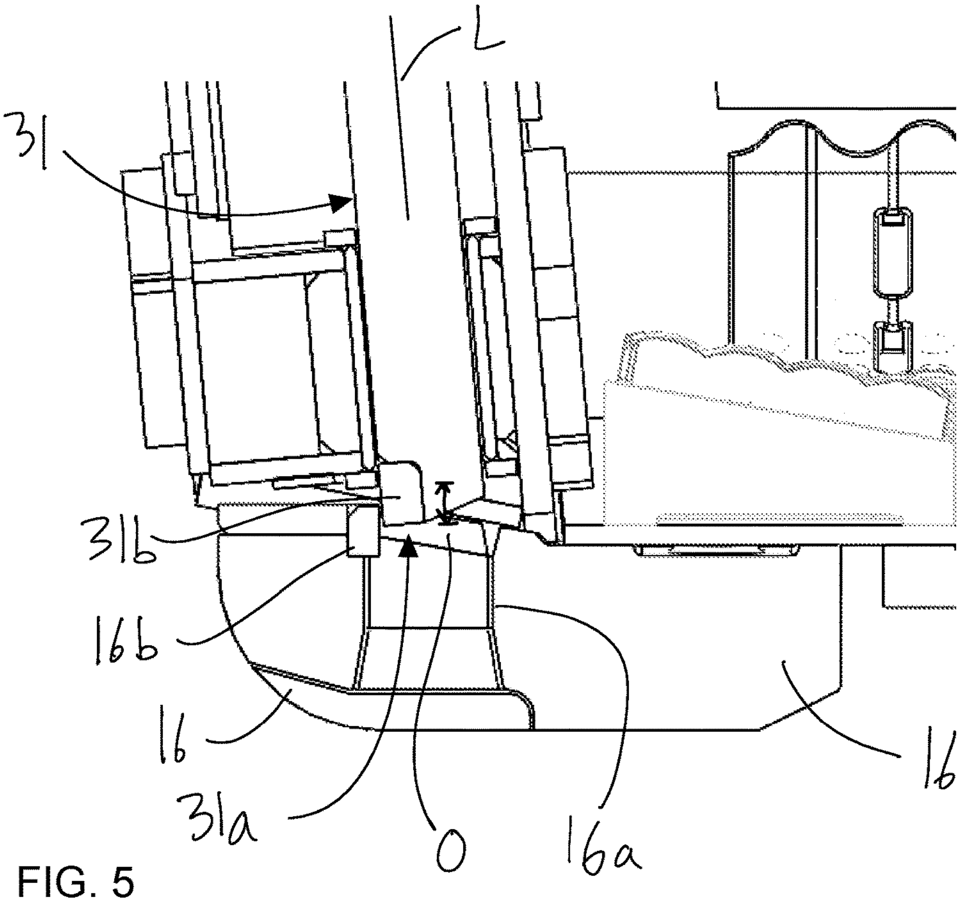
FIG. 5 is a cross-sectional view of the door of FIG. 2 installed on the bucket of FIG. 1.
Figure 4:
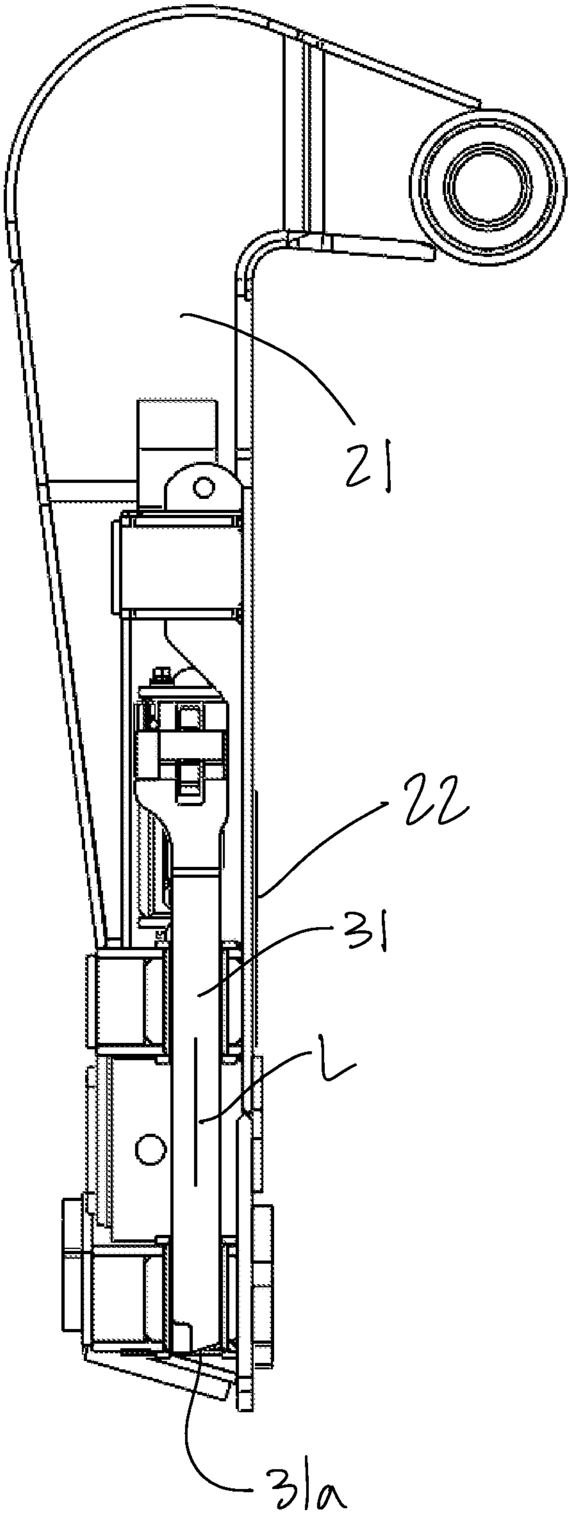
FIG. 4 is a cross-sectional view of the door taken along line 4-4 on FIG. 2.

As shown in FIGS. 4-5, when the lever bar 32 is lowered into the locked position, the latch bar 31 is moved downwardly until a distal end 31*a* of the latch bar 31 is received within the opening 16*a* defined by the latch keeper 16 of the bucket 10. Consequently, the door 20 is mechanically blocked from pivoting to its open position by the lever bar 32. A replaceable insert 31*b* may be located at the distal end 31*a* of the latch bar 31 and may be made of a material being more wear resistant than a material of the latch bar 31. For instance, the insert 31*b* may be made of a metal, such as a steel (e.g. AR500), for its abrasion resistance. The insert 31*b* of the latch bar 31 may be in abutment against a keeper insert 16*b* or like abutment surface such as a Dutchman, a roller(s), secured to the latch keeper 16. The keeper insert 16*b* may be made of the same material of the insert 31*b* of the latch bar 31. The inserts 16*b* and 31*b* are optional, as the latching may rely on the materials of the latch keeper 16 and latch bar 31.

An overlap O taken along a longitudinal axis L of the latch bar 31 is defined between the insert 31*b* of the latch bar 31 and an abutment surface(s) (i.e., latch abutment surface) such as that of the keeper insert 16*b* when the latch bar 31 is in the locked position. The overlap O is preferably between 0.75 inch and 1 inch. An overlap O of less than 0.75 inch may be insufficient to keep the door 20 closed whereas an overlap O of more than 1 inch may require too much force to move the latch bar 31 from the locked position to the unlocked position. Nevertheless, it is contemplated to have an overlap O outside this range. Another range may be from 0.25 inch. Another range may include as high as 6.0 inches.

Typically, to adjust the overlap O, a user inserts or removes shims between the first end 32*a* of the lever bar 32 and a fulcrum on the door 20 to change a height of the fulcrum relative to the door. The shims are used to adjust a distance by which the distal end 31*a* of the latch bar 31 protrudes beyond a periphery of the door 20 and may consequently adjust the overlap O. However, inserting and removing those shims is a tedious task often requiring more than one person. Downtime and profit losses may therefore occur.

The locking mechanism 30 includes an adjusting mechanism 40 that is operable to vary a distance D (FIG. 2) between the fulcrum F located at the first end 32*a* of the lever bar 32 and the bottom edge 22*b* of the body 22 of the door 20. The distance D that is adjusted via the adjusting mechanism 40 is only a reference, as the distance could also be viewed as a distance between the connection point P and the bottom edge 22*b*, or ledge 16, etc. In other words, the adjusting mechanism 40 may vary a maximum penetration depth of the latch bar 31 into the recess 16*a* of the latch keeper 16, namely the overlap O. The adjusting mechanism 40 may at least partially alleviate some of the drawbacks described herein above.

Figure 6:
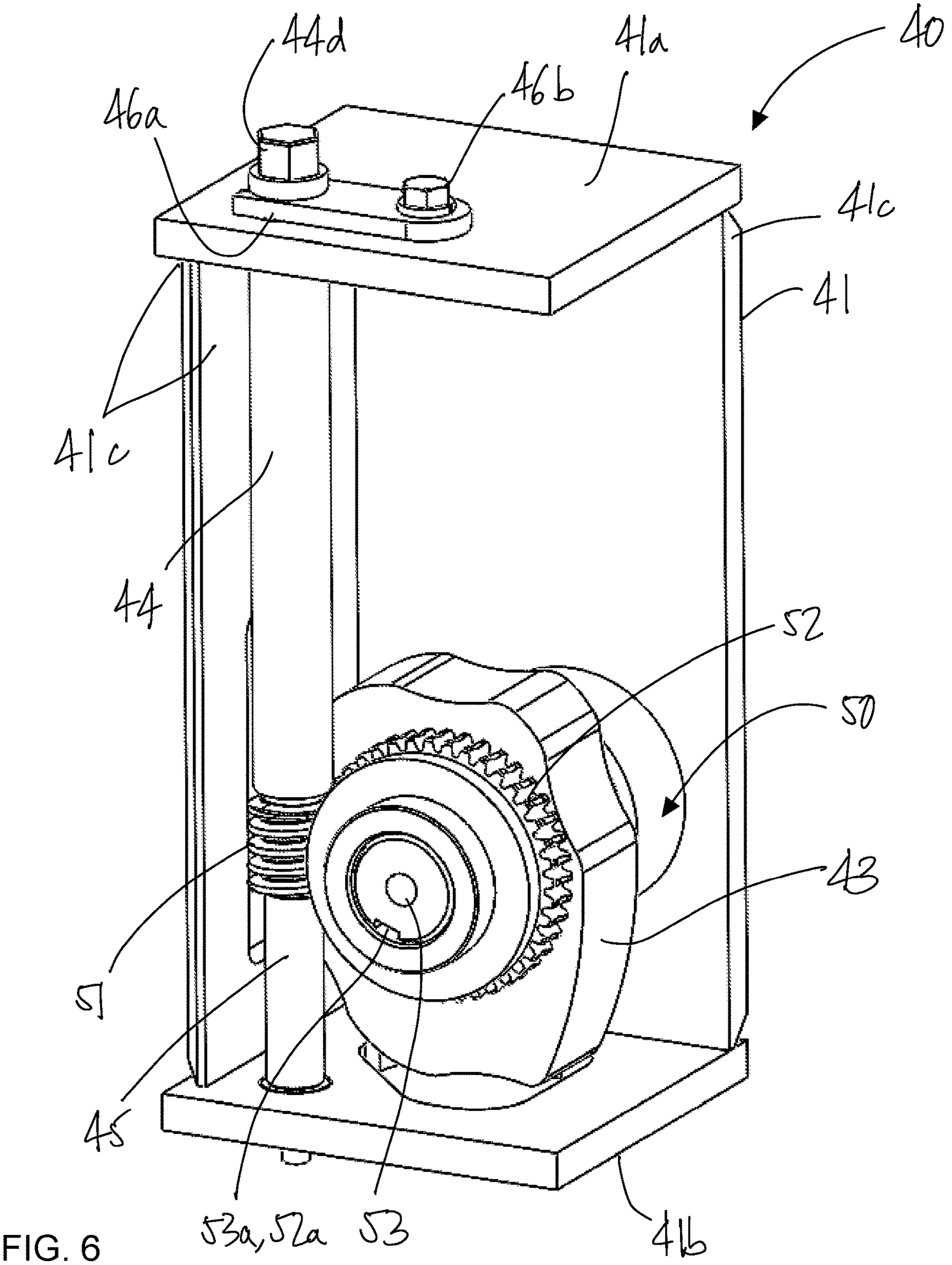
FIG. 6 is a three dimensional semi-transparent view of an adjusting mechanism in accordance with one embodiment for the door of FIG. 2.
Figure 7:
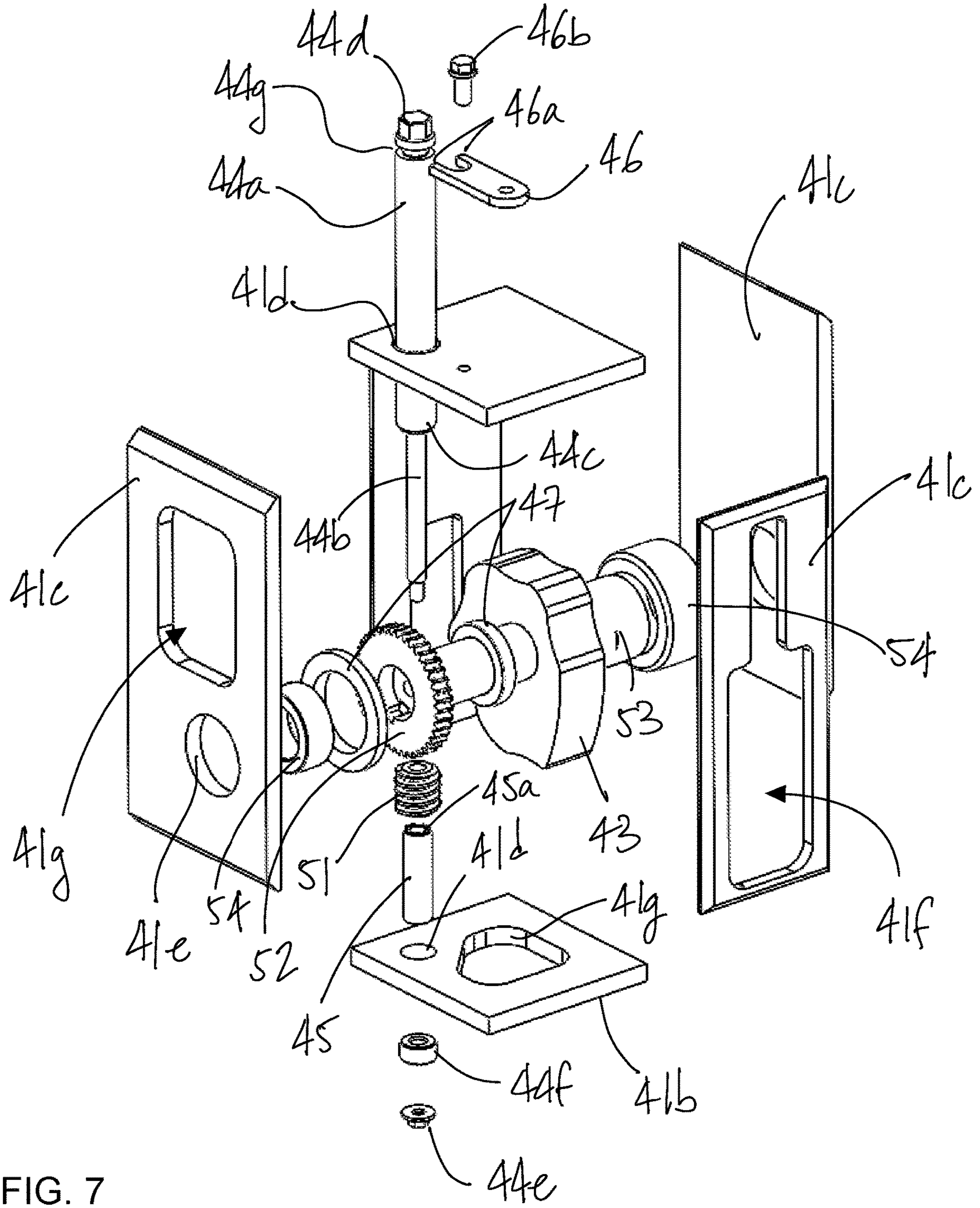
FIG. 7 is a three dimensional exploded view of the adjusting mechanism of FIG. 6.

Referring now to FIGS. 6-7, the adjusting mechanism 40 is described in greater detail. The adjusting mechanism 40 may include an enclosure 41 (i.e., casing, housing) that is secured to the body 22*a* of the door 22. The enclosure 41 has a top wall 41*a*, a bottom wall 41*b* and side walls 41*c* extending from the top wall 41*a* to the bottom wall 41*b*. One of the side walls 41*c* defines an elongated opening 41*f* through which passes the lever bar 32, the opening 41*f* being sized to allow up and down motions of the lever bar 32 relative to the enclosure 41. Openings 41*g* (FIG. 7) are optionally defined by some of the side walls 41*c* and/or by the bottom wall 41*b*. These openings 41*g* are used to allow water and/or dirt to exit the enclosure 41.

A cam 43 defines the fulcrum F against which the first end 32*a* of the lever bar 32 abuts. As explained below, the cam 43 allows an adjustment of the distance D between the first end 32*a* of the lever bar 32 and the bottom edge 22*b* of the body 22 of the door 20 to vary the penetration depth of the latch bar 31 into the recess 16*a* and to vary the overlap O.

The adjusting mechanism 40 includes an axle 44 that is rotatably engaged to the enclosure 41. Namely, the axle 44 is received within apertures 41*d* defined through the top and bottom walls 41*a*, 41*b*, though a single aperture 41*d* and a pivot depression, pillow blocks, etc, could be used as well. Bearings may be disposed between peripheral surfaces of the apertures 41*d* and the axle 44 to assist rotation of the axle 44 relative to the enclosure 41. The bearings may be roller element bearings, plain bearings, a pin with bushings, etc. The axle 44 includes a first portion 44*a* and a second portion 44*b* projecting coaxially from the first portion 44*a*. A diameter of the first portion 44*a* is greater than that of the second portion 44*b* to define a shoulder 44*c*. An annular sleeve 45 is disposed around the second portion 44*b* of the axle 44 to define a second shoulder 45*a*. The axle 44 defines an hexagonal head 44*d* at one of its extremities, or like engageable feature for a tool to impart a rotation to the axle 44. For instance, the hexagonal head 44*d* is located outside the enclosure 41 and is engageable by a ratchet, a wrench, etc to rotate the axle 44 about its longitudinal axis and relative to the enclosure 41. A nut and washer 44*e*, 44*f* may be used at an opposite extremity of the axle 44 to axially secure the axle 44 to the enclosure 41, and hence secure the axle 44 in position relative to the enclosure 41. It will be appreciated that the head 44*d* need not be hexagonal and that other shapes, such as square, are contemplated. In some cases, an aperture defined radially through the axle 44 may be used as a socket to insert at tool to rotate the axle 44. In an embodiment, an axis of rotation of the axle 44 is generally parallel to a direction of movement of the latch bar 31 when projected on a common plane in which the axis of rotation lies. "Generally parallel" may be an angle ranging from −10 degrees to 10 degrees from a virtual intersection. The axis of rotation of the axle 44 could also be generally perpendicular to a direction of movement of the latch bar 31 when projected on a common plane in which the axis of rotation lies. "Generally perpendicular" may be an angle ranging from 80 degrees to 100 degrees from a virtual intersection.

The axle 44 defines an annular recess 44*g* proximate the head 44*d*. The annular recess 44*g* is engageable by two tangs 46*a* of a member such as a plate 46. The plate 46 is securable to the top wall 41*a* of the enclosure 41 via a fastener 46*b*. The two tangs 46*a* are spaced apart from one another by a distance substantially corresponding to a diameter of the axle 44 at the annular recess 44*g*. Hence, once the axle 44 is inserted into the apertures 41*d* of the top and bottom walls 41*a*, 41*b*, or held in the enclosure 41 for rotation on itself, the axle 44 may be axially held in place by the two tangs 46*a* of the plate 46 that block the hexagonal head 44*d* from the axle 44 from penetrating into the enclosure 41. Other configurations are contemplated, such as a flange or washer located in the recess 44*g*, or integral with the axle 44. The axle 44 is held by the enclosure 41, or other structural component (e.g., blocks, etc) so as to be rotatable about its longitudinal axis, while being prevented from moving in translation. Stoppers, abutments, flanges, set screws, etc, may be used to achieve this configuration, the description provided above being one possible configuration among others.

Still referring to FIGS. 6-7, the adjusting mechanism 40 includes a gear assembly 50 into the enclosure 41. The gear assembly 50 is drivingly engaged to the cam 43. The gear assembly 50 includes a worm gear 51 drivingly engaged by the axle 44. In the embodiment shown, the worm gear 51 is mounted coaxially on the second portion 44*b* of the axle 44 and is sandwiched between the shoulder 44*b* defined at the intersection of the first and second portions 44*a*, 44*b* of the axle 44 and the shoulder 45*a* of the sleeve 45. The worm gear 51 is therefore axially locked on the axle 44 by the two shoulders 44*c*, 45*a*. Although not shown, a keyway and ket set may be provided to lock relative rotation between the axle 44 and the worm gear 51. The keyway and key set is one possibility among others, with other possibilities including the worm gear 51 welded to the axle 44, the worm gear 51 integral to the axle 44, set screws, through pin(s), splines, threading engagement.

The gear assembly 50 further includes a spur gear 52 meshed with the worm gear 51. In the present embodiment, the worm gear 51 and the spur gear 52 have axes of rotation that are transverse to one another. The spur gear 52 is drivingly engaged to a shaft 53. The shaft 53 and the spur gear 52 define keyway and key 53*a*, 52*a* (FIG. 6) to lock relative rotation between the shaft 53 and the spur gear 52. Again, the keyway and key set is one possibility among others, with other possibilities including the spur gear 52 welded to the shaft 53, the gear 52 integral to the shaft 53, set screws, through pin(s), splines, threading engagement. The shaft 53 is rollingly engaged within apertures 41*e* defined by two opposed ones of the side walls 41*c* of the enclosure 41, as one possible type of support. Bearings 54 (including any type of bearing, including bushings, plain bearings, etc) may be used to assist rotation of the shaft 53 relative to the enclosure 41. In other words, the shaft 53 is rollingly supported by the enclosure 41, to roll about its longitudinal axis while being stationary in position. Spacers 47 may be mounted on the shaft 53 to axially locate the spur gear 52 and to set an axial position of the spur gear 52 on the shaft 53. The cam 43 is mounted on the shaft 53 for integral rotation therewith. In other words, the cam 43 is drivingly engaged on the shaft 53. The cam 43 may be press-fitted on the shaft 53. Alternatively, a rotation blocking feature such as a keyway and key, set screw, spline, etc may be used to lock rotation of the cam 43 relative to the shaft 53.

It will be understood that any suitable gear arrangement may be used to transmit a rotational input from the axle 44 to the cam 43. A planetary gear, strap and pulleys, and other means may be used for the transmission of the rotational input from the axle 44 to the cam 43. In some cases, two bevel gears may be used. It is also appreciated that the enclosure 41 may be omitted. That is, any suitable means may be used to support the gears, axle, cam, and other components to the door 20 without departing from the scope of the present disclosure. For instance, brackets may be used to support these components on the door 20.

Figure 8:
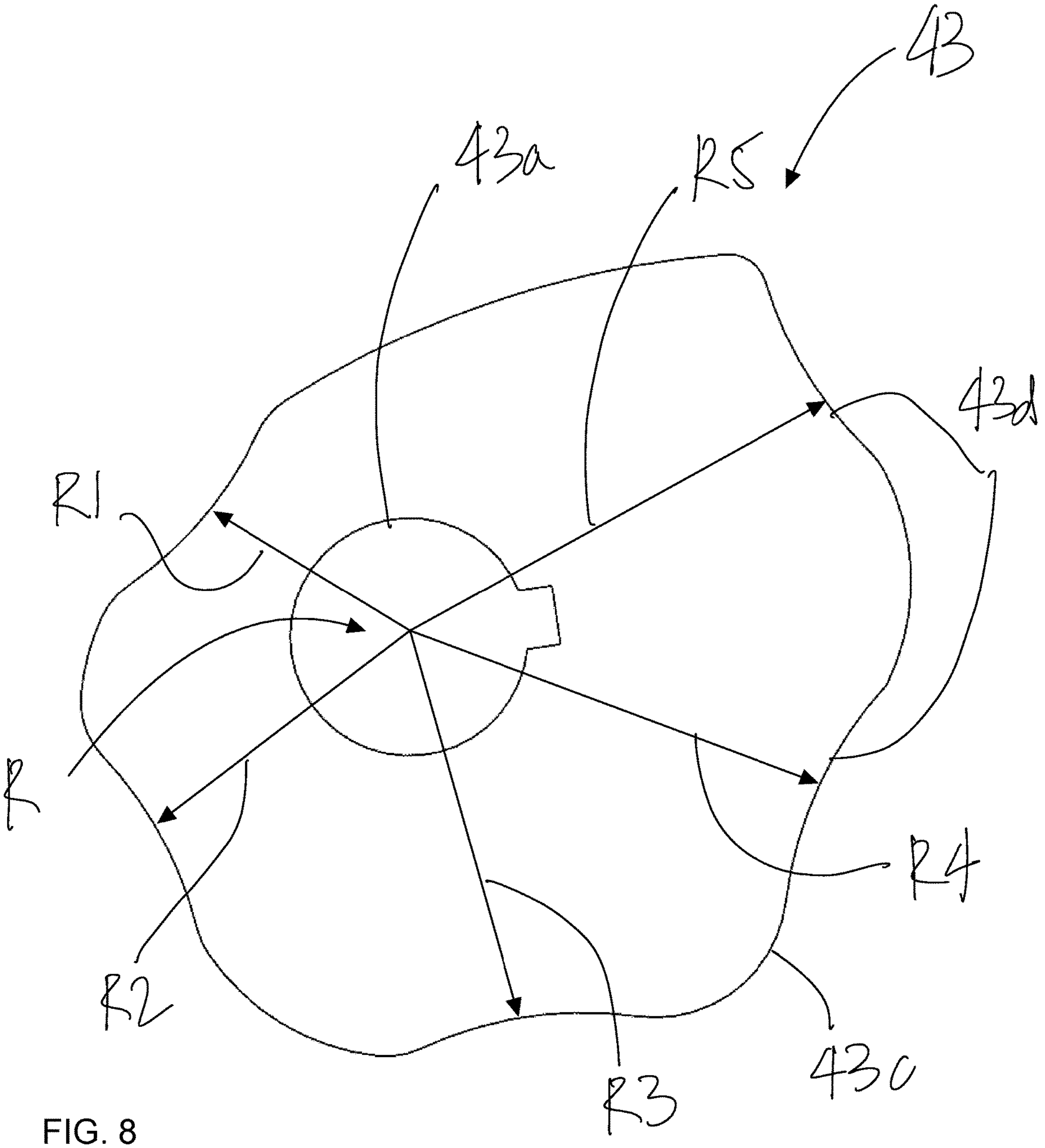
FIG. 8 is a plan view of a cam of the adjusting mechanism of FIG. 6.

Referring now to FIG. 8, the cam 43 is shown in greater detail. The cam 43 has a aperture 43*a* and keyway 43*b* for receiving the shaft 53. The cam 43 has a peripheral wall 43*c* that extends circumferentially around a rotation axis R of the cam 43. The peripheral wall 43*c* defines a plurality of abutment recesses 43*d*, five in the embodiment shown, although more or less than five abutment recesses 43*d* may be used. The expression "recess" may imply that a concavity is formed on the peripheral walls 43*c*, and such concavity or concavities may contribute to a seating of the lever bar 32 into engagement with the fulcrum defined by the cam 43. The abutment recesses 43*d* may be defined as different abutment surfaces, even though they are all part of the peripheral wall 43*c*, as the peripheral wall 43*c* is shaped to define apparent surfaces. Each of the abutment recesses 43*d* is radially distanced from the rotation axis R by a respective radius R1, R2, R3, R4, R5. The radii increase from a first radius R1 to a fifth radius R5. Instead of being stepped as shown, the peripheral wall 43*c* may be arcuate, such as by being an eccentric circular section, being oval, being egg-shaped, etc. In an embodiment, in spite of the non-circular shape of the circumference of the cam 43 and the presence of abutment recesses 43*d*, the circumference is smooth and continuous, i.e., it does not have edges (i.e., edges in an axial direction, notwithstanding the peripheral edges), to facilitate a sliding of the lever bar 32 on the cam 43. The abutment recesses 43*d* are shaped to substantially match a shape of the first end 32*a* of the lever bar 32. Herein, the abutment recesses 43*d* are concave to mate with the first end 32*a* of the lever bar 32. This may prevent a disengagement of the first end 32*a* of the lever bar 32 from the cam 43. Each of the abutment recesses 43*d* is a possible fulcrum F against which the first end 32*a* of the lever bar 32 may abut. The fulcrum F may therefore be moved up and down relative to the longitudinal axis L (FIG. 5) of the latch bar 31 to vary the overlap O and the penetration depth of the latch bar 31 into the latch keeper 16.

The different parts of the adjusting mechanism 40 and gear assembly 50 having been describe, operation of the adjusting mechanism 40 is now described. In use, when it is required to adjust the overlap O between the insert 31*b* of the latch bar 31 and the keeper insert 16*b*, a user may use a tool, such as a ratchet, to drivingly engage the head 44*c* of the axle 44 to rotate the axle 44 about its longitudinal axis. Alternatively, motorization may be used to rotate the axle 44. Rotation of the axle 44 induces rotation of the worm gear 51 that is drivingly engaged on the axle 44. The worm gear 51 is meshed with the spur gear 52 such that rotation of the worm gear 51 induces rotation of the spur gear 52 and of the shaft 53 on which the spur gear 52 is mounted. Rotation of the shaft 53 causes rotation of the cam 43. The user therefore rotates the axle 44 until another one of the abutment recesses 43*d* becomes in contact with the first end 32*b* of the lever bar 32. The user may choose a direction of rotation of the axle 44 (e.g., clockwise, counter clockwise) to either increase a vertical distance between the first end 32*b* of the lever bar 32 and the shaft 53 thereby increasing an effective height of the fulcrum to decrease the overlap O. Or, the user may decrease the vertical distance between the first end 32*b* of the lever bar 32 and the shaft 53 thereby decreasing the effective height of the fulcrum to increase the overlap O to increase the overlap O. The gear assembly 50 has a self-blocking feature, in that it passively holds an orientation of the cam 43 by mechanical jamming. Stated differently, the engagement of the teeth of the spur gear 52 with the worm gear 51 block the spur gear 52 from rotating—i.e., block an orientation of the spur gear 52—a rotation of the worm gear 51 being required to cause a rotation of the spur gear 52. Unless receiving torque from a user or motor, the gear assembly 50 is static. Moreover, the lever bar 32 resting on an abutment recess 43*d* is aligned vertically with a center of rotation of the cam 43, the lever bar 32 will not bias the cam 43 in rotating.

The disclosed adjusting mechanism 40 may allow an adjustment of a height of a fulcrum of the lever bar 32 in a safe manner and without requiring undue effort. Ease of adjustment of the overlap O may allow a decrease in the duration of downtime. The ease of adjustment provided by the disclosed adjusting mechanism 40 may allow an increase in the frequency of the adjustment. There is substantially no force or weight applied on the adjusting mechanism 40, and off-the-shelf tools may be used for the adjustment. The adjustment is self-locking due to the worm gear 51. That is, it is possible to rotate the cam 43 using the head 44*c* of the axle 44, but exerting a rotational force directly on the cam 43 will not result in its rotation. The different openings 41*g* defined through the enclosure 41 may allow dirt to escape the enclosure 41 upon actuation of the adjusting mechanism 40.

The locking mechanism 30 may be generally described as being for a bucket of the type having a main body defining a cavity and an opening configured for unloading a content of the bucket from the cavity and a door pivotally mounted on the main body, the door movable between a closed position in which the opening is substantially closed by the door and an opened position in which the content may exit the bucket via the opening. The locking mechanism 30 may include a locking mechanism having a latch bar engaged by a lever bar, the lever bar in abutment against a fulcrum, the lever bar movable between a locked position in which the latch bar locks the door in the closed position by engagement with at least one abutment surface on the main body, and an unlocked position in which the latch bar is disengaged from at least one abutment surface to allow movement of the door from the closed position to the opened position. An adjusting mechanism may be operable to move the fulcrum relative to the door to vary an overlap of the latch bar with the at least one abutment surface.

As can be seen therefore, the examples described above and illustrated are intended to be exemplary only. The scope is indicated by the appended claims.

What is claimed is:

1. A locking mechanism for a bucket of the type having a main body defining a cavity and an opening configured for unloading a content of the bucket from the cavity and a door pivotally mounted on the main body, the door movable between a closed position in which the opening is substantially closed by the door and an opened position in which the content may exit the bucket via the opening, the locking mechanism comprising:

a locking mechanism having a latch bar engaged by a lever bar, the lever bar in abutment against a fulcrum, the lever bar movable between a locked position in which the latch bar locks the door in the closed position by engagement with at least one abutment surface on the main body, and an unlocked position in which the latch bar is disengaged from at least one abutment surface to allow movement of the door from the closed position to the opened position; and an adjusting mechanism operable to move the fulcrum relative to the door to vary an overlap of the latch bar with the at least one abutment surface wherein the fulcrum is defined by a cam, the cam rotatable about a cam axis, the cam defining a plurality of abutment surfaces circumferentially distributed around the cam axis, the adjusting mechanism operable to rotate the cam about the cam axis to move the fulcrum relative to the door.

2. The locking mechanism according to claim 1, wherein each of the abutment surfaces being radially distanced from the cam axis by respective distances.

3. The locking mechanism according to claim 1, wherein a circumferential surface of the cam is edgeless between its peripheral edge.

4. The locking mechanism according to claim 1, wherein the cam defines at least one concavity.

5. The locking mechanism according to claim 1, wherein the adjusting mechanism has a gear assembly drivingly engaged to the cam for rotating the cam about the cam axis.

6. The locking mechanism according to claim 5, wherein the adjusting mechanism has an axle, the axle drivingly engaged to the cam via the gear assembly.

7. The locking mechanism according to claim 6, wherein the axle is drivingly engageable by a ratchet.

8. The locking mechanism according to claim 6, wherein the gear assembly includes a worm gear meshed with a spur gear.

9. The locking mechanism according to claim 8, wherein the worm is mounted to the axle and the spur gear is in driving engagement with the cam.

10. The locking mechanism according to claim 6, wherein an axis of rotation of the axle is generally parallel to a direction of movement of the latch bar when projected on a common plane in which the axis of rotation lies.

11. The locking mechanism according to claim 1, wherein the cam is on a shaft supported by at least one bearing or at least one bushing.

12. The locking mechanism according to claim 1, wherein the latch bar is connected to the lever bar between fulcrum and an actuated end of the lever bar.

13. The locking mechanism according to claim 1, wherein the overlap is between 0.125 inch and 6 inches.

14. A bucket comprising:

a main body defining a cavity and an opening configured for unloading a content of the bucket from the cavity;

a door pivotally mounted on the main body, the door movable between a closed position in which the opening is substantially closed by the door and an opened position in which the content may exit the bucket via the opening; and the locking mechanism according to claim 1, the locking mechanism mounted on the door.

15. The bucket according to claim 14, wherein the at least one abutment surface on the main body is in a recess.

16. A locking mechanism for a bucket of the type having a main body defining a cavity and an opening configured for unloading a content of the bucket from the cavity and a door pivotally mounted on the main body, the door movable between a closed position in which the opening is substantially closed by the door and an opened position in which the content may exit the bucket via the opening, the locking mechanism comprising:

a locking mechanism having a latch bar engaged by a lever bar, the lever bar in abutment against a fulcrum, the lever bar movable between a locked position in which the latch bar locks the door in the closed position by engagement with at least one abutment surface on the main body, and an unlocked position in which the latch bar is disengaged from at least one abutment surface to allow movement of the door from the closed position to the opened position; and an adjusting mechanism operable to move the fulcrum relative to the door to vary an overlap of the latch bar with the at least one abutment surface;

wherein the fulcrum is defined by a cam, the cam rotatable about a cam axis, the cam defining at least one abutment surface circumferentially distributed around the cam axis, the adjusting mechanism operable to rotate the cam about the cam axis to move the fulcrum relative to the door; and wherein the adjusting mechanism has a gear assembly drivingly engaged to the cam for rotating the cam about the cam axis.

17. The locking mechanism according to claim 16, wherein the adjusting mechanism has an axle, the axle drivingly engaged to the cam via the gear assembly.

18. The locking mechanism according to claim 17, wherein the axle is drivingly engageable by a ratchet.

19. The locking mechanism according to claim 17, wherein the gear assembly includes a worm gear meshed with a spur gear.

20. The locking mechanism according to claim 19, wherein the worm is mounted to the axle and the spur gear is in driving engagement with the cam.

21. The locking mechanism according to claim 17, wherein an axis of rotation of the axle is generally parallel to a direction of movement of the latch bar when projected on a common plane in which the axis of rotation lies.

22. A locking mechanism for a bucket of the type having a main body defining a cavity and an opening configured for unloading a content of the bucket from the cavity and a door pivotally mounted on the main body, the door movable between a closed position in which the opening is substantially closed by the door and an opened position in which the content may exit the bucket via the opening, the locking mechanism comprising:

a locking mechanism having a latch bar engaged by a lever bar, the lever bar in abutment against a fulcrum, the lever bar movable between a locked position in which the latch bar locks the door in the closed position by engagement with at least one abutment surface on the main body, and an unlocked position in which the latch bar is disengaged from at least one abutment surface to allow movement of the door from the closed position to the opened position; and an adjusting mechanism operable to move the fulcrum relative to the door to vary an overlap of the latch bar with the at least one abutment surface;

wherein the latch bar is connected to the lever bar between fulcrum and an actuated end of the lever bar.

* * * * *